United States Patent
Mestha et al.

(10) Patent No.: US 7,397,581 B2
(45) Date of Patent: Jul. 8, 2008

(54) TRC SMOOTHING ALGORITHM TO IMPROVE IMAGE CONTOURS IN 1D COLOR CONTROLS

(75) Inventors: Lalit K. Mestha, Fairport, NY (US); Sohail Dianat, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 714 days.

(21) Appl. No.: 11/097,751

(22) Filed: Apr. 1, 2005

(65) Prior Publication Data

US 2006/0222257 A1 Oct. 5, 2006

(51) Int. Cl.
*G06F 15/00* (2006.01)
*G06K 1/00* (2006.01)
*H04N 1/60* (2006.01)
*H04N 1/409* (2006.01)

(52) U.S. Cl. .................. 358/1.9; 358/1.2; 358/3.27

(58) Field of Classification Search .............. 358/1.9, 358/1.2, 520, 521, 522, 518, 517, 3.02, 3.03, 358/3.04, 3.05, 3.27
See application file for complete search history.

(56) References Cited

U.S. PATENT DOCUMENTS

| | | | |
|---|---|---|---|
| 5,347,369 A | 9/1994 | Harrington | 358/401 |
| 5,696,889 A | 12/1997 | Morikawa | 395/109 |
| 5,777,656 A | 7/1998 | Henderson | 347/251 |
| 6,384,918 B1 | 5/2002 | Hubble, III et al. | 356/402 |
| 6,484,631 B2 | 11/2002 | Degani et al. | 101/171 |
| 6,538,661 B1 | 3/2003 | Farnung et al. | 345/594 |
| 6,668,155 B1 | 12/2003 | Hubble, III et al. | 399/406 |
| 6,694,109 B1 | 2/2004 | Donaldson et al. | 399/49 |
| 6,697,582 B1 | 2/2004 | Scheuer | 399/49 |
| 6,744,531 B1 | 6/2004 | Mestha et al. | 358/1.9 |
| 6,809,855 B2 | 10/2004 | Hubble, III et al. | 359/320 |
| 6,842,266 B1 | 1/2005 | Farnung et al. | 358/1.9 |
| 7,167,595 B2 * | 1/2007 | Hiroshige et al. | 382/266 |
| 2004/0136013 A1 | 7/2004 | Mestha et al. | 358/1.9 |
| 2004/0136015 A1 | 7/2004 | Van de Capelle et al. | 358/1.9 |

* cited by examiner

*Primary Examiner*—Douglas Q Tran
(74) *Attorney, Agent, or Firm*—Richard H. Krukar; Luis M. Ortiz; Kermit D. Lopez (57) ABSTRACT

Printing occurs when a marking engine deposits ink on a substrate to produce a pattern. The printed pattern can differ from the desired pattern when the marking engine is out of adjustment, the substrate and ink do not interact optimally, or for other reasons. A tone reproduction curve can be used to adjust the pattern or the marking engine so the printed pattern and desired pattern are similar. Another effect of printing is that contours can appear. Contouring can be reduced if a smooth tone reproduction curve is used. Aspects of the embodiments address limitations and flaws in the prior art by using a smoothing parameter and a smoothing matrix to produce TRCs that minimize contours.

20 Claims, 8 Drawing Sheets

TRC SMOOTHING ALGORITHM TO IMPROVE IMAGE CONTOURS IN 1D COLOR CONTROLS

TECHNICAL FIELD

Embodiments are generally related to printing methods and systems. Embodiments are also related to adjusting marking engine inputs to produce for consistent and accurate printing of text and images without contours.

BACKGROUND

Printing is the art of producing a pattern on a substrate. The substrate is usually paper and the pattern is usually text and images. A marking engine performs the actual printing by depositing ink, toner, dye, or similar patterning materials on the substrate. For brevity, the word "ink" will be used to represent the full range of patterning materials. In the past, the pattern was introduced to the marking engine in the form of a printing plate. Modernly, digital data is commonly used to specify the pattern. The pattern can be a data file stored in a storage device.

People often want to produce a pattern using different marking engines. When many copies of the pattern are desired it is convenient to use many marking engines. For example, a publisher believing that a book will be very popular might want a few million copies of the book. The publisher can use dozens of marking engines to produce all those copies. One risk that the publisher faces is that different marking engines produce different copies. One marking engine can produce dark copies. Another might produce copies that look too red. Furthermore, marking engines change over time. As such, the marking engines must be calibrated so that they all produce similar copies all of the time.

Figure 1:
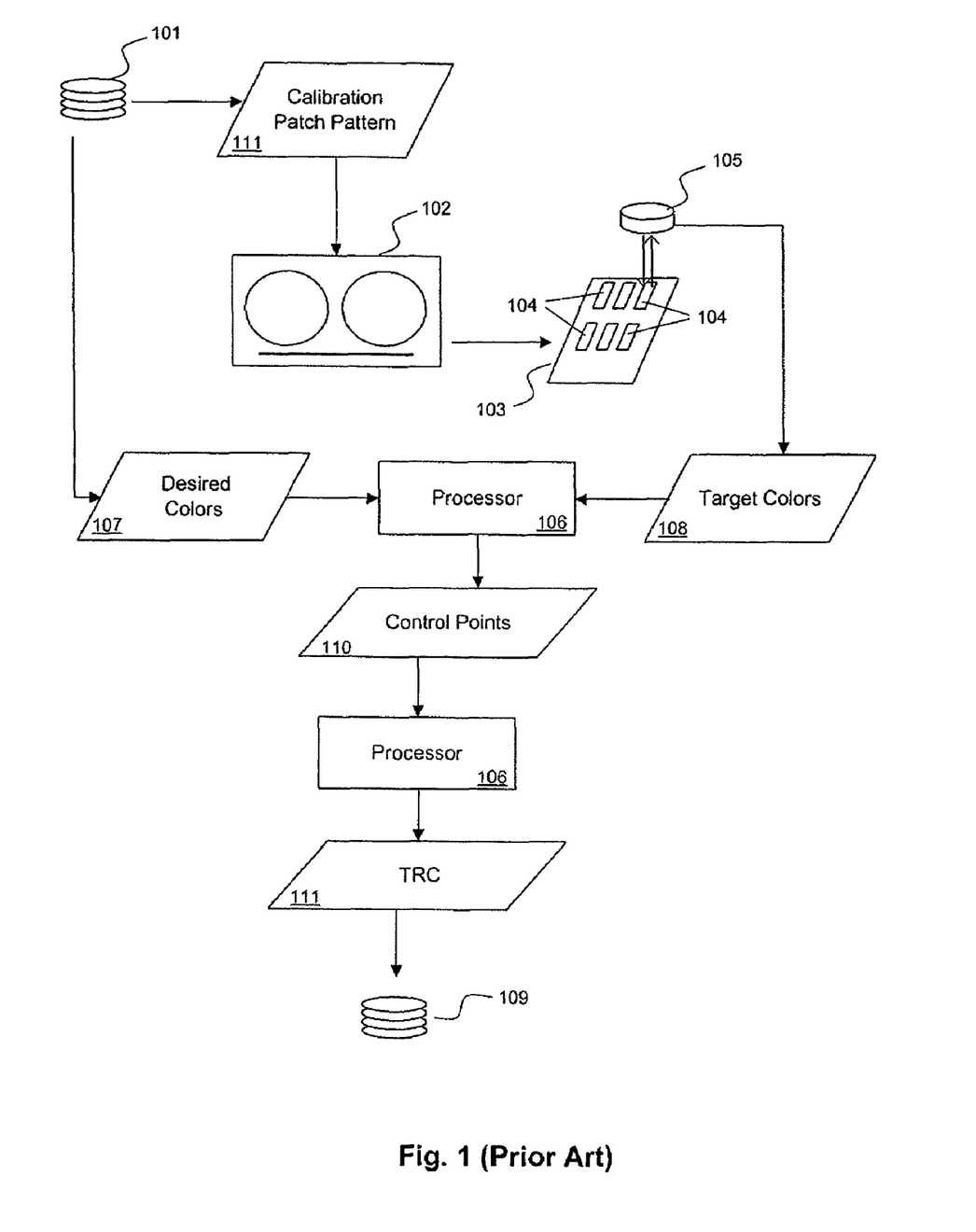
FIG. 1, labeled as prior art, illustrates producing a tone reproduction curve for a marking engine.

FIG. 1, labeled as prior art, illustrates producing a tone reproduction curve 108 for a marking engine 102. A storage device 101 stores a calibration patch pattern in the form of data. A calibration patch pattern is a collection of calibration patches. Every calibration patch has a desired color and the desired colors 107 are also stored by the storage device 101. Every color, including black and shades of gray, can be characterized by its reflectance. A marking engine 102 accepts the calibration patch pattern and prints a target patch pattern 103. A target patch pattern 103 contains a number of target patches 104 with each target patch 104 corresponding to a calibration patch.

A reflectance measuring device 105, such as that disclosed in U.S. Pat. No. 6,384,918, can measure the target patch pattern 103. Every target patch 104 has a reflectance and the reflectance measuring device 105 can measure those reflectances. The measured reflectances are the target colors 108. Target colors 108 and desired colors 107 can be utilized by a processor 106 to produce control points 107. A processor 106 can also use the control points 110 to produce a tone reproduction curve 111. The tone reproduction curve 111 can then be stored on a storage device 109.

Figure 2:
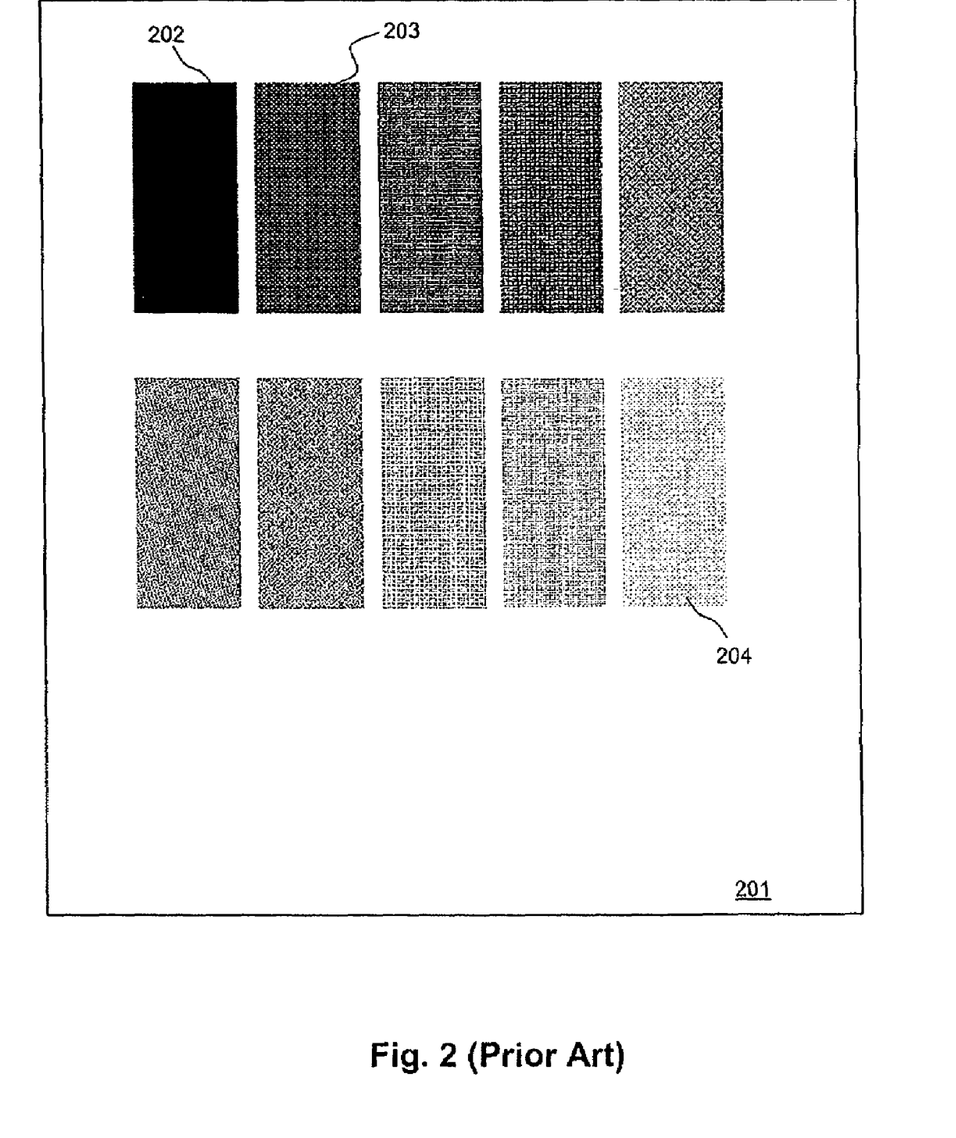
FIG. 2, labeled as prior art, illustrates one possible target patch pattern.

FIG. 2, labeled as prior art, illustrates one possible target patch pattern 201. There are ten different target patches in the illustrated target patch pattern 201. The black patch 202 is the patch that is most saturated with black ink or toner. The 90% patch 203 is supposed to be 90% as dark as the black patch 202. The 10% patch 204 is supposed to be 10% as dark as the black patch 202. The paper outside of and between the patches can be measured to find the color of unpatterned substrate. The target patch pattern of FIG. 2 uses only black ink. Other target patch patterns use produced with cyan, magenta, and yellow inks as well.

Figure 3:
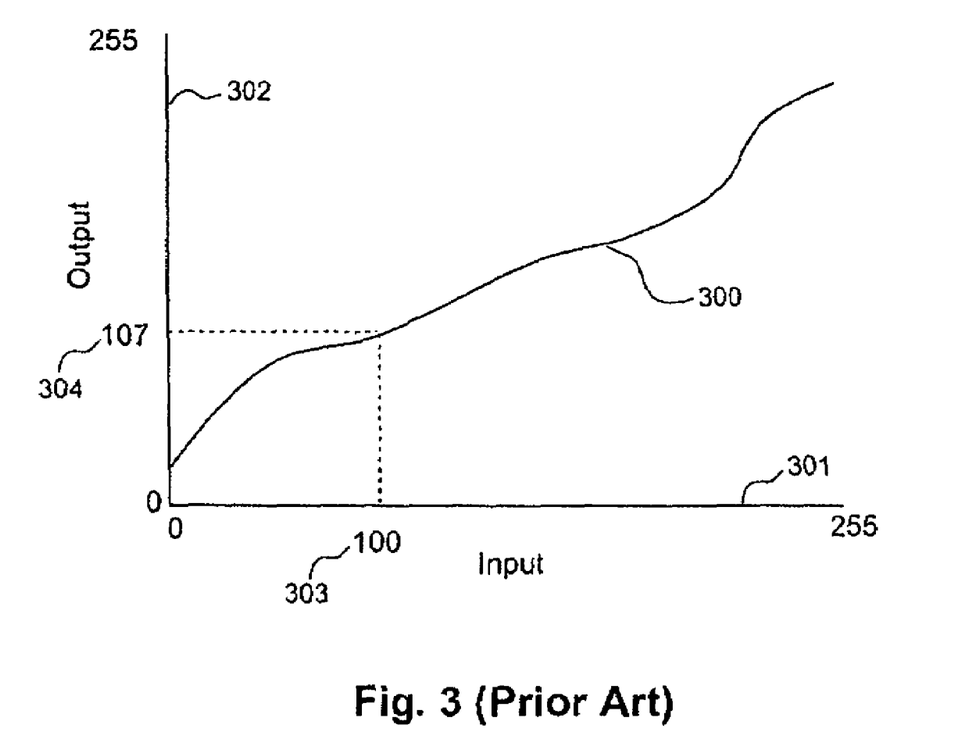

FIG. 3, labeled as prior art, illustrates a TRC 300. TRCs can be used to adjust the amount of ink a marking engine uses to produce a color. The input axis 301 and the output axis 302 are both shown to have values ranging from 0 to 255. Although other ranges can be used to similar effect, the 0-255 range is used here for illustrative purposes. A value of 0 indicates no ink is to be deposited on the substrate. A value of 255 indicates a maximum amount of ink is to be deposited on the substrate. Values between 0 and 255 indicate intermediate amounts of ink are to be deposited. Without a TRC, a request for 100 yellow results in a corresponding amount of yellow ink. With a TRC, a request for 100 yellow can be mapped to a different amount of ink. In FIG. 3, a value of 100 is input 303. The TRC 300 maps the input to the output. The 100 input 303 is mapped to 107 output 304. The TRC 300 of FIG. 3, can be used to map a request for 100 yellow into a request for 107 yellow.

An example of the usefulness of TRCs is using black ink to produce a shade of gray. Under ideal conditions, the desired gray is made by depositing 70 black. The marking engine used, however, always deposits too little black ink. It deposits 70 black when it is asked to deposit 77 black. A TRC can be used to map the 70 to 77. The request for 70 black becomes a request for 77 black. The marking engine then produces the desired shade of gray by depositing 70 black.

Many marking engines use cyan, magenta, and yellow inks in addition to black ink. Cyan, magenta, and yellow are primary colors when used in marking engines because they can be combined in various proportions to produce an entire gamut of colors. As such, a printed image can be thought of as a combination of a cyan image, a magenta image, a yellow image, and a black image. Each of the images in the combination is also known as a color separation. For example, a calibration patch pattern can have four patches, one each of cyan, magenta, yellow, and black. The magenta color separation would appear as a single magenta patch. Similarly, the black color separation would appear as a single black patch.

Another example of the usefulness of TRCs is using cyan, magenta, yellow, and black inks to produce a process gray. A process gray is a gray that is ideally created by depositing no black ink and equal amounts of cyan, magenta, and yellow inks. Marking engines typically deposit an amount of ink other than that requested. The desired gray in this example is ideally made by depositing 128 cyan, 128 magenta, 128 yellow, and 0 black. The marking engine used, however, deposits 128 cyan when 131 is requested, 128 magenta when 127 is requested, 128 yellow when 130 is requested, and 0 black when 0 is requested. TRCs can adjust the requested amounts so that the marking engine is requested to deposit 131 cyan, 127 magenta, 130 yellow, and 0 black. The marking engine then actually deposits 128 cyan, 128 magenta, 128 yellow, and 0 black to produce the desired process gray.

Figure 4:
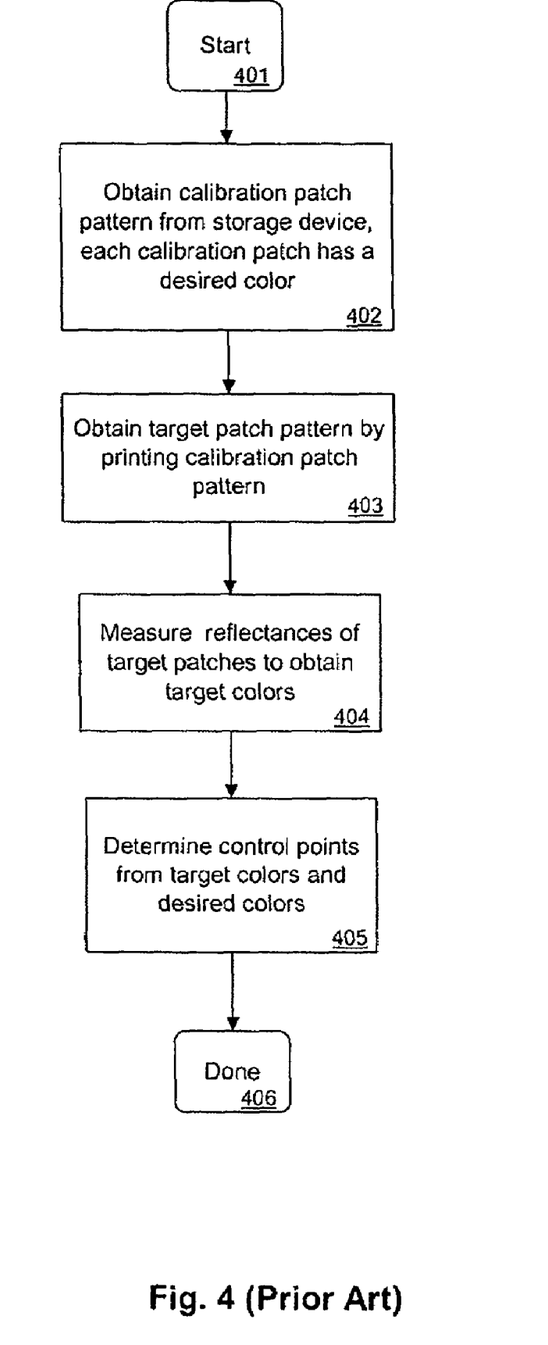
FIG. 4, labeled as prior art, illustrates a high level flow diagram of a process for obtaining control points.

FIG. 4, labeled as prior art, illustrates a high level flow diagram of a process for obtaining control points. After the start 401, a calibration patch pattern can be obtained from a storage device. As discussed above, every calibration patch has a desired color. Next, the calibration patch pattern can be printed on a substrate to produce a target patch pattern 403. The target colors of the target patches in the target patch pattern can then be measured 404. Control points can be determined from the desired colors and target colors 405 because every target color is associated with desired color through the acts of printing and reflectance measurement. Then the process is done 406.

FIG. 4 illustrates one process flow for determining control points. Control points can be obtained or determined in a variety of other ways. Some of those ways are described in U.S. Pat. No. 6,744,531, United States Patent Application Publication No. 20040136015A1, and United States Patent Application Publication No. 2004136013A1, which are incorporated herein by reference.

Figure 5:
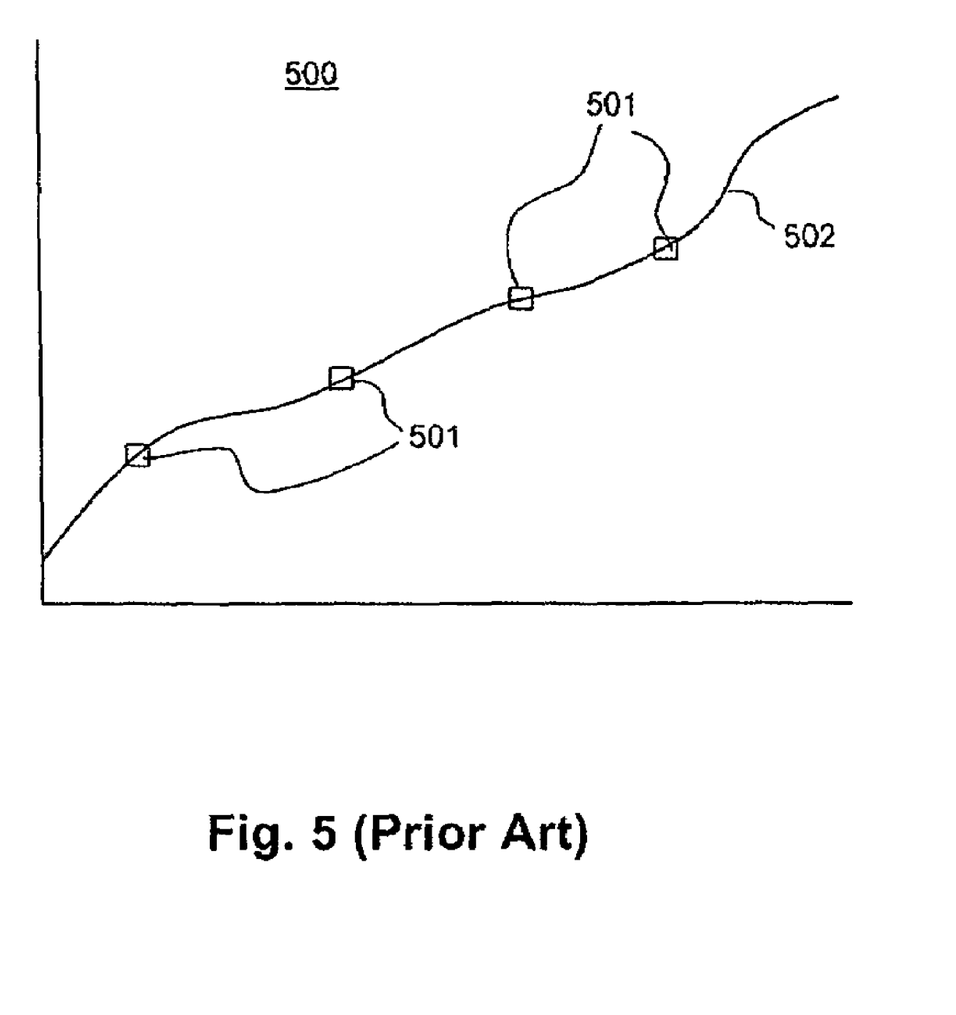
FIG. 5, labeled as prior art, illustrates a graph with four control points.

FIG. 5, labeled as prior art, illustrates a graph 500 with four control points 501. A curve 502 can be fit to the control points. The curve 502 can be used as a TRC. Fitting the curve 502 to the control points 501 is necessary because there is calibration data for only four points and the curve 502, used as a TRC, must be defined for 255 points.

The curve 502 of FIG. 5 was fit to the control points by a person. Curves can also be fit to control points by curve fitting algorithms. Curve fitting algorithms typically interpolate between the control points and extrapolate, if necessary, to the minimum and maximum values that the curve must include. Current curve fitting algorithms and techniques do not produce adequate TRCs when producing TRCs from calibration data because of contouring.

Contouring is a visible artifact that can detract from a printed image. One example appears in printed images having large areas that appear to be one color or shade, such as a picture with a blue cloudless sky. In reality, there are many subtly different areas that are not apparent to the human eye because the areas blend together. An improper TRC can remove the blending effect so that sharply defined areas of slightly different color become readily apparent to the human eye.

Another example of contouring is an image with a smooth transition between two different shades or colors. An improper TRC can remove the smooth transition and replace it with a series of differently colored bands.

Curve fitting algorithms often yield TRCs that produce contours. A need therefore exists for producing TRCs that do not produce contours.

BRIEF SUMMARY

Aspects of the embodiments address limitations and flaws in the prior art by using a smoothing parameter and a smoothing matrix to produce TRCs that minimize contours.

It is an aspect of the embodiments to determine a set of control points and use them to construct a control vector and a sampling matrix. As discussed above, a control point can be determined from a target color and a desired color. A control point can also be determined in other ways. For example, a person can create a control point based on external factors such as experience or personal beliefs.

It is also an aspect of the embodiments to determine a smoothing matrix and a smoothing parameter. The smoothing matrix and smoothing parameter can be determined by guessing, trial and error, empirically, or analytically. One analytical way to determine a smoothing matrix is as the square of a difference matrix, such as the first difference matrix or the second difference matrix. A smoothing parameter can be determined analytically by dividing the trace of the square of the sampling matrix by the trace of the smoothing matrix.

It is a further aspect of the embodiments to use the smoothing parameter, smoothing matrix, sampling matrix, and control vector to produce a TRC. The TRC can be used for printing images and the images examined for contours. If objectionable contours appear in the images, the smoothing parameter can be changed and another TRC produced. In this manner, the smoothing parameter and TRC can be iteratively refined. Similarly, if there are no contours, the smoothing parameter and TRC can be refined until objectionable contours do appear. Once objectionable contours appear, the TRC can be iteratively smoothed to remove them. In this manner a TRC that is smooth enough to avoid objectionable contours but is not too smooth can be produced.

It is another aspect of the embodiments to determine a set of control points and use them to construct a control vector for each color separation and a sampling matrix for each color separation. When an image is printed with more than one ink, then each ink can produce a separation. When control points are determined, some of them are influenced by one color separation, others by many color separations. The color of each separation, however, can be treated independently of the others. As such, control vectors and sampling matrices for every color separation can be constructed from a set of control points.

It is yet another aspect of the embodiments to determine smoothing matrices, smoothing parameters, and TRCs for every color separation. Furthermore, each TRC can be iteratively refined in the same manner as a single TRC is refined, discussed above.

It is a yet further aspect of the embodiments to store at least one calibration patch pattern and at least one smoothing matrix on a storage device. The calibration patch pattern contains more than one calibration patch and every calibration patch has a desired color. A marking engine can print the calibration patch pattern on a substrate to produce a target patch pattern. The individual calibration patches in the calibration patch pattern can be printed as target patches in the target patch pattern.

It is a still yet further aspect of the embodiments to measure the target patches to obtain target colors. The target colors, desired colors, smoothing matrices, and a smoothing parameter can be used to produce TRCs. The smoothing parameter can be obtained from user input and can also be calculated from the available data such as the target colors, desired colors, and smoothing matrices.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

FIG. 3, labeled as prior art, illustrates a TRC;

DETAILED DESCRIPTION

The particular values and configurations discussed in these non-limiting examples can be varied and are cited merely to illustrate embodiments and are not intended to limit the scope of the invention.

Aspects of the embodiments can be shown by producing a TRC based on control points, smoothing parameters, and smoothing matrices. The TRC developed will have inputs and outputs ranging from 0 to 9. This range does not correspond with most physical apparatus because a range of 0 to 255 or a range of 0 to 1023 is more appropriate. Other ranges are also possible, but a range of 0 to 9 is adequate for describing developing smoothed TRCs. The TRC can be defined as: $f=[f_o\ f_1\ f_2\ f_3\ f_4\ f_5\ f_6\ f_7\ f_8\ f_9]^T$, where the superscript T indicates the transpose operation. The subscript 0 in the variable $f_0$ indicates that inputting a 0 to the TRC results in an $f_0$ output.

Table 1 shows four control points. The data presented is made up. It was not determined by experimentation. The source of the data, however, is not relevant because while control points can be determined empirically, they need not be.

TABLE 1

|  | Input | Output |
|---|---|---|
| Control Point 1 | 1 | 2 |
| Control Point 2 | 4 | 4 |
| Control Point 3 | 6 | 6 |
| Control Point 4 | 9 | 8 |

A control vector, B, can be constructed from the data in Table 1 as $B=[2\ 4\ 6\ 8]^T$. As can be seen, the control vector is constructed from the control point outputs.

A sampling matrix, P, can be constructed from the data in the input column of Table 1. Four control points results in the four row sampling matrix:

$$P = \begin{bmatrix} 0 & 1 & 0 & 0 & 0 & 0 & 0 & 0 & 0 & 0 \\ 0 & 0 & 0 & 0 & 1 & 0 & 0 & 0 & 0 & 0 \\ 0 & 0 & 0 & 0 & 0 & 0 & 1 & 0 & 0 & 0 \\ 0 & 0 & 0 & 0 & 0 & 0 & 0 & 0 & 0 & 1 \end{bmatrix}$$

Every row in the sampling matrix is all zeros except for one position which has a 1. Control point 1 has a value of 1, therefore row 1 has a 1 in the first position. Control point 2 has a value of 4, therefore row 2 has a 1 in the fourth position. Control point 3 has a value of 6, therefore row 3 has a 1 in the sixth position. Control point 4 has a value of 9, therefore row 4 has a 1 in the ninth position. The TRC, sampling matrix, and control matrix solve the following equation: Pf=B. Performing the matrix multiplication yields four identities: $f_1=2$, $f_4=4$, $f_6=6$, and $f_9=8$. The four identities express the data presented in Table 1.

A smoothing matrix can be the square of a difference matrix. The 9×10 first difference matrix is defined as:

$$C_1 = \begin{bmatrix} 1 & -1 & 0 & 0 & 0 & 0 & 0 & 0 & 0 & 0 \\ 0 & 1 & -1 & 0 & 0 & 0 & 0 & 0 & 0 & 0 \\ 0 & 0 & 1 & -1 & 0 & 0 & 0 & 0 & 0 & 0 \\ 0 & 0 & 0 & 1 & -1 & 0 & 0 & 0 & 0 & 0 \\ 0 & 0 & 0 & 0 & 1 & -1 & 0 & 0 & 0 & 0 \\ 0 & 0 & 0 & 0 & 0 & 1 & -1 & 0 & 0 & 0 \\ 0 & 0 & 0 & 0 & 0 & 0 & 1 & -1 & 0 & 0 \\ 0 & 0 & 0 & 0 & 0 & 0 & 0 & 1 & -1 & 0 \\ 0 & 0 & 0 & 0 & 0 & 0 & 0 & 0 & 1 & -1 \end{bmatrix}$$

The square of a matrix, A, is defined as $A^TA$. When the smoothing matrix, Q, is the square of the first difference matrix then:

$$Q = C_1^T C_1 = \begin{bmatrix} 1 & -1 & 0 & 0 & 0 & 0 & 0 & 0 & 0 & 0 \\ -1 & 2 & -1 & 0 & 0 & 0 & 0 & 0 & 0 & 0 \\ 0 & -1 & 2 & -1 & 0 & 0 & 0 & 0 & 0 & 0 \\ 0 & 0 & -1 & -2 & -1 & 0 & 0 & 0 & 0 & 0 \\ 0 & 0 & 0 & -1 & 2 & -1 & 0 & 0 & 0 & 0 \\ 0 & 0 & 0 & 0 & -1 & 2 & -1 & 0 & 0 & 0 \\ 0 & 0 & 0 & 0 & 0 & -1 & 2 & -1 & 0 & 0 \\ 0 & 0 & 0 & 0 & 0 & 0 & -1 & 2 & -1 & 0 \\ 0 & 0 & 0 & 0 & 0 & 0 & 0 & -1 & 2 & -1 \\ 0 & 0 & 0 & 0 & 0 & 0 & 0 & 0 & -1 & 1 \end{bmatrix}$$

A similar smoothing matrix based on the second difference matrix, $C_2$, can be defined as $Q=C_2^T C_2$ where:

$$C_2 = \begin{bmatrix} -1 & 2 & -1 & 0 & 0 & 0 & 0 & 0 & 0 & 0 \\ 0 & -1 & 2 & -1 & 0 & 0 & 0 & 0 & 0 & 0 \\ 0 & 0 & -1 & 2 & -1 & 0 & 0 & 0 & 0 & 0 \\ 0 & 0 & 0 & -1 & 2 & -1 & 0 & 0 & 0 & 0 \\ 0 & 0 & 0 & 0 & -1 & 2 & -1 & 0 & 0 & 0 \\ 0 & 0 & 0 & 0 & 0 & -1 & 2 & -1 & 0 & 0 \\ 0 & 0 & 0 & 0 & 0 & 0 & -1 & 2 & -1 & 0 \\ 0 & 0 & 0 & 0 & 0 & 0 & 0 & -1 & 2 & -1 \end{bmatrix}$$

A TRC can be calculated as $f=(P^TP+\alpha Q)^{-1}P^TB$ where $\alpha$ is the smoothing parameter. An initial smoothing parameter can be chosen by a person or it can be calculated as $\alpha = Tr(P^TP)/Tr(Q)$, where Tr( ) is the trace function. In the example $Tr(P^TP)=4$, $Tr(Q)=Tr(C_1^T C_1)=18$, and therefore $\alpha=0.22$. Using the matrices given, the TRC is:

f=[2.14 2.14 2.78 3.42 4.06 5.0 5.93 6.58 7.2 7.86].

If the TRC is not smooth enough, then a can be increased and another TRC calculated. Conversely, the TRC can be too smooth, which usually means that the TRC does not agree well with the control points. Decreasing $\alpha$ reduces smoothness, but increases agreement with the control points. For example, $\alpha=0.01$ gives:

f=[2.01 2.01 2.67 3.34 4.0 5.0 6.0 6.66 7.33 7.99].

Figure 6:
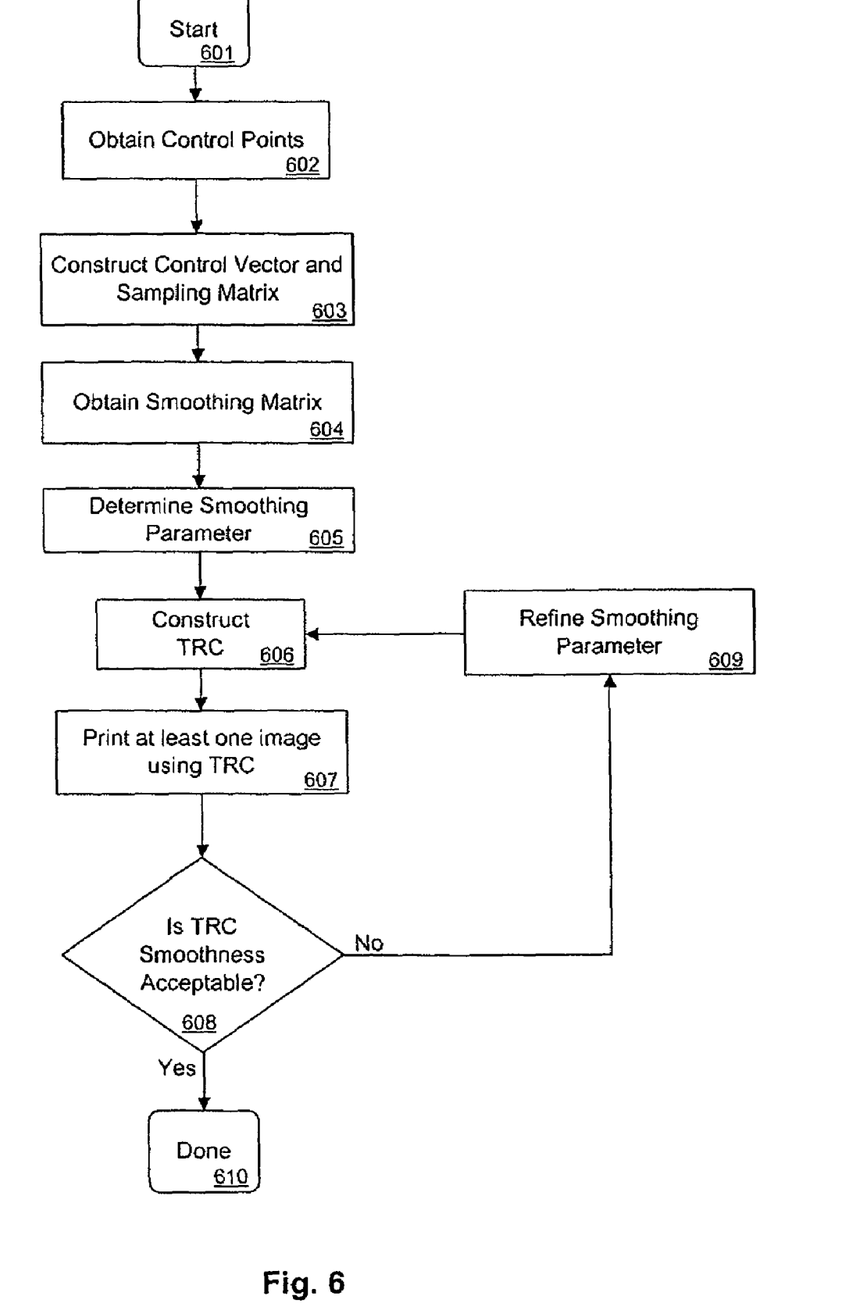
FIG. 6 illustrates a high level flow diagram for producing and refining a TRC.

FIG. 6 illustrates a high level flow diagram for producing and refining a TRC. After the start 601, control points are obtained. Next a control vector and sampling matrix are constructed 603 as discussed above. A smoothing matrix is obtained 604 and a smoothing parameter is then determined 605 before a TRC is calculated 606. The process can stop at this point if there is no desire to refine the TRC. Otherwise, at least one image is printed using the TRC 607 and the TRC smoothness is checked 608. If the TRC produces image contouring, then the TRC smoothness is not acceptable and the smoothing parameter is refined 609 in the direction of producing a smoother TRC. If the TRC produces no image contouring, then the TRC smoothness is probably acceptable and the process flow is done 610. A user can find a TRC that produces no contouring to be too smooth and opt to refine the smoothing parameter 609 in the direction of producing a less smooth TRC. The TRC smoothness can be reduced until contouring appears and then increased until barely acceptable contouring results.

Figure 7:
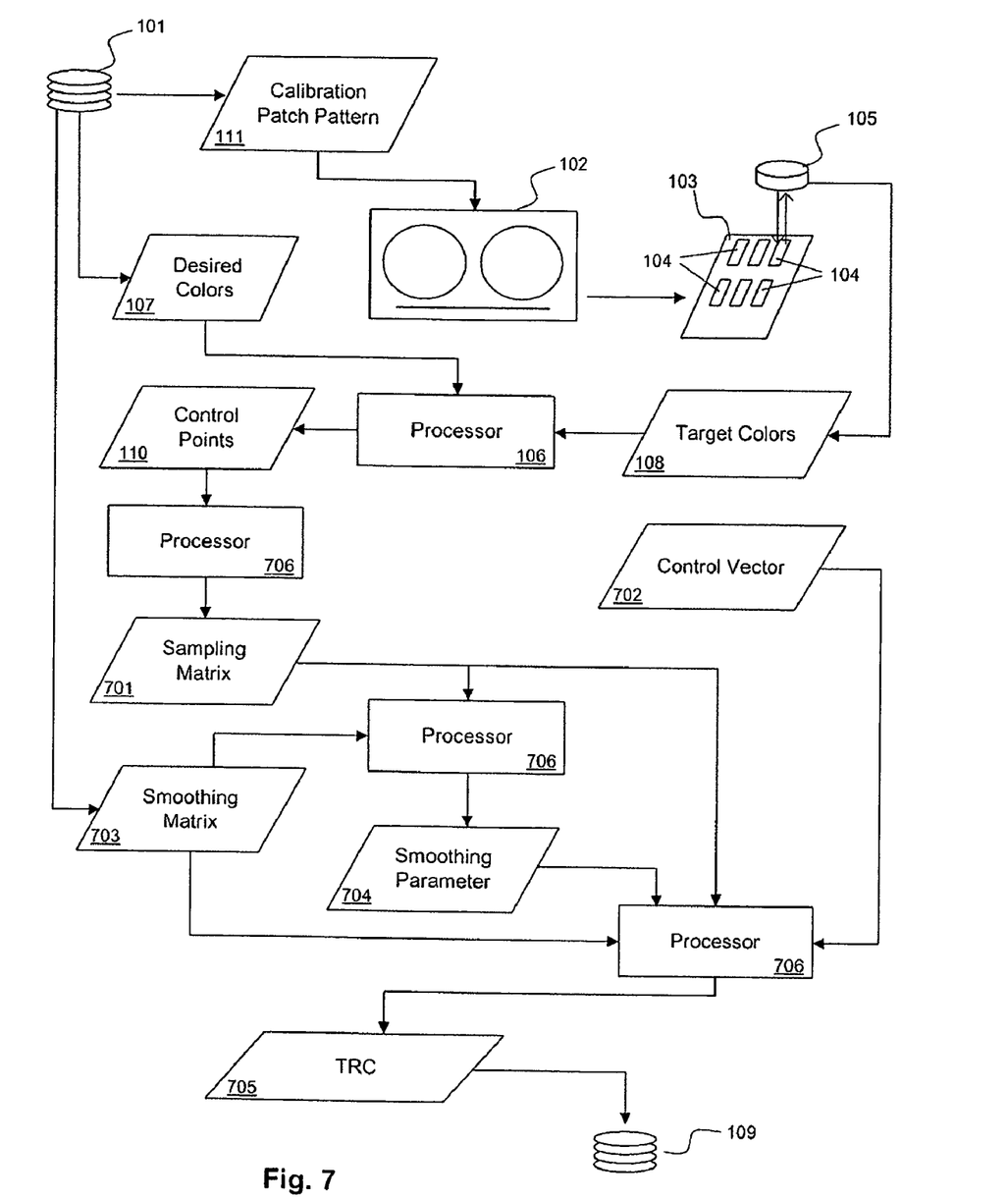
FIG. 7 illustrates a system used for producing a smooth tone reproduction curve for a marking engine.

FIG. 7 illustrates a system used for producing a smooth tone reproduction curve 705 for a marking engine 102. The differences between FIG. 7 and FIG. 1 will be discussed because the common elements operate and interact the same in each illustration. A processor 706 can use the control points 110 to produce a sampling matrix 701 and a control vector 702. A processor 706 can also retrieve a smoothing matrix 703 from the storage device 101 and use it along with the sampling matrix 701 and control vector 702 to determine a smoothing parameter 704. Not shown in the illustration is that the smoothing parameter can also be supplied by a person or as the product of an iterative process such as that of FIG. 6. A processor 706 can use the smoothing parameter 704, smoothing matrix 703, control vector 702, and sampling matrix 701 to determine a TRC 705 that is stored on a storage device 109.

FIG. 7 uses many processor elements 106 and more processor elements 706. The tasks performed by the separately diagrammed processors can all be performed by a single processor or by a combination of processors. After considering these teachings, those practiced in the arts of programming, computer design, or machine design will appreciate numerous equivalent ways to divide tasks among functional units.

Figure 8:
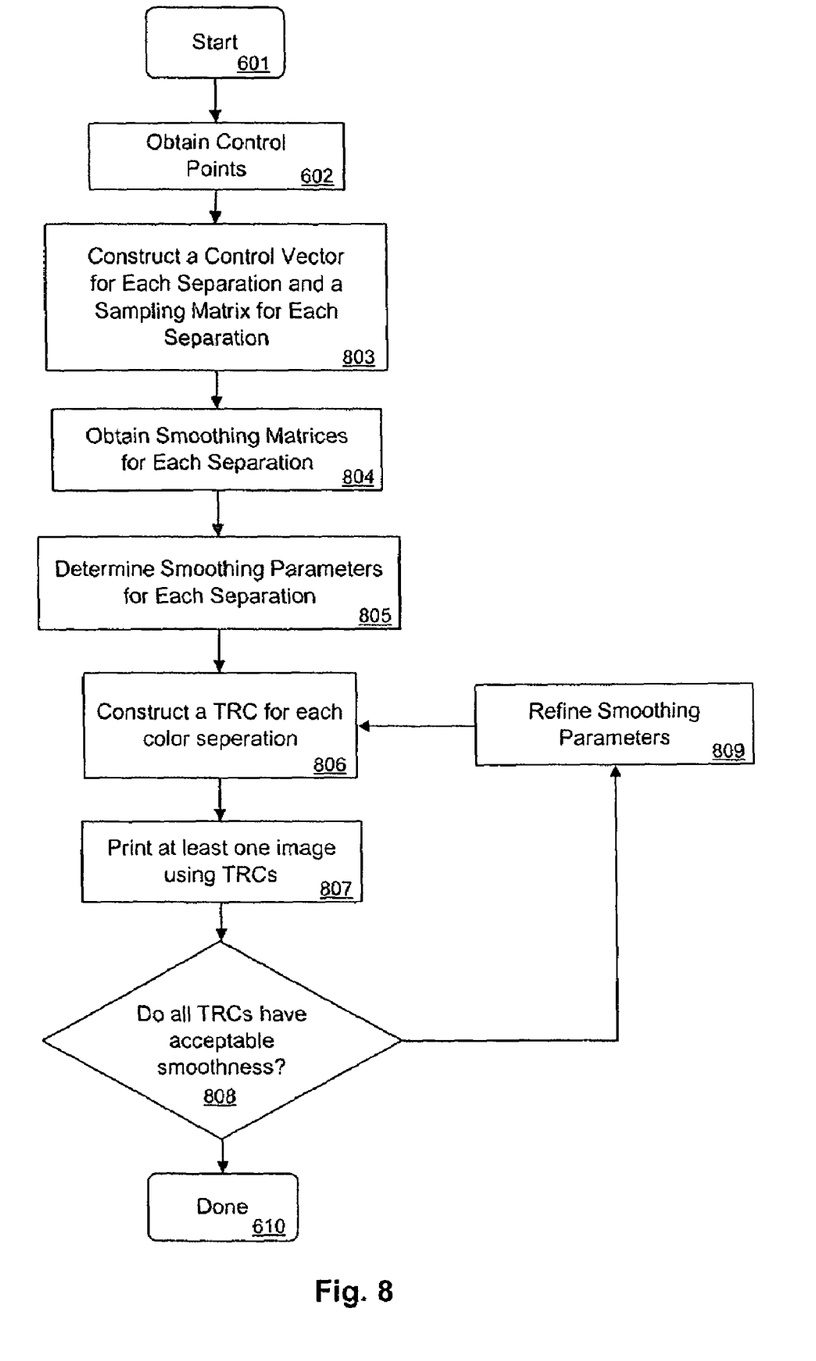
FIG. 8 illustrates a high level flow diagram for producing and refining a TRC for each color in a separation.

FIG. 8 illustrates a high level flow diagram for producing and refining a TRC for each color in a separation.

Embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules or implementations thereof. Such modules can be utilized separately or together to form a program product that can be implemented through signal-bearing media, including transmission media and recordable media.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method comprising:
   determining a multiplicity of control points and using said multiplicity of control points to construct a control vector and a sampling matrix;
   determining a smoothing matrix and a smoothing parameter; and
   producing a tone reproduction curve based on said control vector, said sampling matrix, said smoothing matrix, and said smoothing parameter; thereby producing a tone reproduction curve for use in printing images with reduced contours.

2. The method of claim 1 wherein a user supplies said smoothing parameter.

3. The method of claim 1 wherein said smoothing parameter is determined by dividing the trace of the square of said sampling matrix by the trace of said smoothing matrix.

4. The method of claim 1 further comprising:
   using said tone reproduction curve for printing at least one image;
   refining said smoothing parameter based on contours in said at least one image; and
   refining said tone reproduction curve based on said smoothing parameter.

5. The method of claim 1 wherein said smoothing matrix is the square of a first difference matrix.

6. The method of claim 1 wherein said smoothing matrix is the square of a second difference matrix.

7. A method comprising:
   determining a multiplicity of control points for each of at least one color separation and using said multiplicity of control points to construct at least one control vector and at least one sampling matrix;
   determining at least one smoothing matrices and at least one smoothing parameters; and
   producing at least two tone reproduction curves based on said at least one control vector, said at least one sampling matrix, said at least one smoothing matrix, and said at least one smoothing parameter; thereby producing at least one tone reproduction curve for use in printing images with reduced contours.

8. The method of claim 7 wherein a user supplies said at least one smoothing parameter.

9. The method of claim 7 wherein said at least one smoothing parameter is determined by dividing the trace of the square of said at least one sampling matrix by the trace of said at least one smoothing matrix.

10. The method of claim 7 further comprising:
    using said at least one tone reproduction curve for printing at least one image;
    refining said at least one smoothing parameter based on contours in said at least one image; and
    refining said at least one tone reproduction curve based on said smoothing parameter.

11. The method of claim 7 wherein said at least one smoothing matrix is the square of a first difference matrix.

12. The method of claim 7 wherein said at least one smoothing matrix is the square of a second difference matrix.

13. A system comprising:
    a storage device adapted to store data comprising at least one smoothing matrix and also comprising a calibration patch pattern comprising at least two calibration patches with at least two desired colors;

a marking engine that marks a substrate based on said calibration patch pattern to produce a target patch pattern comprising at least two target patches;

a color measuring device that obtains at least two target color measurements from said target patch pattern;

a processor that uses said at least two desired colors, said at least two target color measurements, said at least one smoothing matrix, and at least one smoothing parameter to determine at least one tone reproduction curve;

a second storage device adapted to store said at least one tone reproduction curve.

14. The method of claim 13 further comprising:
using said at least one tone reproduction curve for printing at least one image;
refining said at least one smoothing parameter based on contours in said at least one image; and
refining said at least one tone reproduction curve based on said smoothing parameter.

15. The method of claim 13 wherein a user supplies said at least one smoothing parameter.

16. The method of claim 15 further comprising:
using said at least one tone reproduction curve for printing at least one image;
refining said at least one smoothing parameter based on contours in said at least one image; and
refining said at least one tone reproduction curve based on said smoothing parameter.

17. The method of claim 13 wherein said at least one smoothing parameter is determined by dividing the trace of the square of said at least one sampling matrix by the trace of said at least one smoothing matrix.

18. The method of claim 17 further comprising:
using said at least one tone reproduction curve for printing at least one image;
refining said at least one smoothing parameter based on contours in said at least one image; and
refining said at least one tone reproduction curve based on said smoothing parameter.

19. The method of claim 13 wherein said at least one smoothing matrix is the square of a first difference matrix.

20. The method of claim 13 wherein said at least one smoothing matrix is the square of a second difference matrix.

* * * * *